United States Patent
Jacques et al.

(10) Patent No.: US 7,045,185 B2
(45) Date of Patent: May 16, 2006

(54) POLYAMIDE-BASED COMPOSITION FOR FLEXIBLE PIPES CONTAINING OIL OR GAS

(75) Inventors: Bernard Jacques, Lillois (BE); Bernard Pees, Beaumontel (FR); Michael Werth, Bernay (FR)

(73) Assignee: Arkema, Paris la Defense Cedex (FR)

( * ) Notice: Subject to any disclaimer, the term of this patent is extended or adjusted under 35 U.S.C. 154(b) by 0 days.

(21) Appl. No.: 11/012,620

(22) Filed: Dec. 16, 2004

(65) Prior Publication Data

US 2005/0101745 A1    May 12, 2005

Related U.S. Application Data

(62) Division of application No. 10/378,077, filed on Mar. 4, 2003, now Pat. No. 6,913,043.

(30) Foreign Application Priority Data

Mar. 4, 2002   (FR)   ................................. 02 02689

(51) Int. Cl.
  *C08L 77/00* (2006.01)

(52) U.S. Cl. ..................... 428/35.7; 428/35.8; 524/111; 524/113; 524/159; 524/168; 524/169; 524/284; 524/291; 525/178

(58) Field of Classification Search ................ 525/178; 524/169, 168, 514, 111, 113, 159, 284, 291; 428/35.7, 35.8

See application file for complete search history.

(56) References Cited

U.S. PATENT DOCUMENTS

| 4,567,238 A | 1/1986 | Sasaki et al. |
| 4,939,237 A | 7/1990 | Besso |
| 4,950,436 A | 8/1990 | Kitami et al. |
| 5,111,849 A * | 5/1992 | Zeh ............................ 138/118 |
| 5,614,683 A | 3/1997 | Kranbuehl |

FOREIGN PATENT DOCUMENTS

| DE | 3439312 A1 | 5/1985 |
| DE | 41 32 123 A1 | 4/1992 |
| FR | 1.592.857 | 6/1990 |

* cited by examiner

*Primary Examiner*—Ana Woodward
(74) *Attorney, Agent, or Firm*—Millen, White, Zelano, Branigan, P.C.

(57) ABSTRACT

A composition comprising by weight:
  70 to 96% of at least one polyamide chosen from PA-11, PA-12, aliphatic polyamides resulting from the condensation of an aliphatic diamine having from 6 to 12 carbon atoms and an aliphatic diacid having from 9 to 12 carbon atoms, and 11/12 copolyamides having either more than 90% of nylon-11 units or more than 90% of nylon-12 units;
  4 to 10% of a plasticizer;
  0 to 25% of an NBR or H-NBR elastomer; and
  the sum of the amount of plasticizer and the amount of elastomer is between 4 and 30%;

can be manufactured by melt-blending the various constituents using standard techniques for thermoplastics. The composition is particularly useful for pipes used in the operation of offshore oil and gas fields. They exhibit very good ageing resistance. They are also useful for simpler pipes in motor vehicles, these compositions withstanding the ageing caused by the temperature under the bonnet of motor vehicles and the nature of the fluids transported. Pipes which comprise at least one layer of this composition are useful for offshore uses and for simpler pipes used in motor vehicles.

29 Claims, No Drawings

POLYAMIDE-BASED COMPOSITION FOR FLEXIBLE PIPES CONTAINING OIL OR GAS

This is a divisional of application Ser. No. 10/378,077, filed Mar. 4, 2003, now U.S. Pat. No. 6,913,043.

FIELD OF THE INVENTION

The present invention relates to a polyamide-based composition for flexible pipes containing oil or gas. In the operation of offshore oil or gas deposits it is necessary to use flexible pipes to connect the various devices around the platform. These pipes must withstand hot oil, gas, water and mixtures of at least two of these products for periods possibly as long as 20 years. These pipes consist in general of a non-impermeable metal inner layer formed by a profiled metal tape wound in a helix, such as an interlocked strip, which gives the pipe shape, then a polymer is extruded over this layer in order to provide sealing and, finally, other protective and reinforcing layers are added, such as metal fibre plies and rubber plies. For surface temperatures below 40° C., the polymer is an HDPE (high-density polyethylene), up to 90° C. it is a polyamide, and above that, up to 130° C., it is a PVDF (polyvinyledene fluoride). The present invention relates to pipes in which the polymer is a polyamide. A novel polyamide-based composition has been developed which exhibits better ageing resistance. It may also be used in other applications, in particular in motor vehicles.

PRIOR ART AND TECHNICAL PROBLEM

Patent U.S. Pat. No. 4,950,436 discloses pipes for the fluids of an air-conditioning system, comprising an inner layer made of a polyamide possibly containing polyolefins, such as PE (polyethylene), PP (polypropylene) or EPR (ethylene-propylene rubber), then, going towards the outside of the pipe, a rubber layer and then finally textile reinforcing layers.

Patent DE 4 132 123 discloses pipes for the same application as the previous patent, comprising an inner layer made of a polyamide containing acrylic rubbers, which may be acrylic ester/acrylonitrile copolymers, and then, going towards the outside of the pipe, a textile reinforcing layer and finally an outer layer made of rubber which may be NBR (the abbreviation for nitrile butadiene rubber).

Patent FR 1 592 857 discloses blends of polyamides, nitrile rubber and plasticizer. The nature of the nitrile rubber is not specified. Most of the examples relate to blends based on a copolyamide having a melting point of 120° C. Example 3 describes blends consisting of 75 parts of PA-6, 25 parts of nitrile rubber and 30 to 52 parts of resorcinol as plasticizer. These blends are used as adhesives.

Patent DE 3 439 312 discloses pipes for the fluids of an air-conditioning system, consisting of an inner layer which is a blend of 30 to 70% (preferably 40 to 60%) by weight of polyamide and 70 to 30% (preferably 60 to 40%) of rubber and of an outer layer made of a polyolefin having functional groups in order to adhere to the inner layer. The rubber may be NBR.

Patent U.S. Pat. No. 4,567,238 discloses pipes consisting of a polyamide blend and of a blend of an NBR rubber carrying epoxy functional groups with an epichlorohydrin rubber (that is to say a rubber containing ether functional groups) and a diacid in order to crosslink the rubbers. The example richest in polyamide contains 80% PA-12, 10% NBR having epoxy functional groups, and HYDRIN rubber described as an epichlorohydrin/ethylene oxide copolymer.

None of these prior art documents relates to pipes for the offshore industry or to their ageing owing to the effect of temperature or of contact with fluids. The polyamide used in offshore pipes is in general PA-11 or PA-12, but it is necessary to add a plasticizer to it in order to extrude it more easily and also to reduce the flexural modulus. These polyamides are suitable, but they have the drawback of ageing too quickly. The term "ageing" is understood to mean a reduction in mechanical properties, such as the elongation at break and the tensile strength. The ageing is more rapid the higher the operating temperature. It has now been discovered that ageing is due not only to slow hydrolysis of the polyamide owing to the effect of the moisture in the products transported, but also to reorganization of the microcrystalline structure of the polyamide, caused by departure of the plasticizer. The plasticizer is extracted by contact with the oil or gas. The amount of plasticizer was therefore reduced and, advantageously, NBR or H-NBR (hydrogenated NBR) elastomer added.

Patent U.S. Pat. No. 5,614,683 described the monitoring of the ageing of PA-11 by the change in its molar mass. There is no mention of plasticizer and no remedy is proposed.

BRIEF DESCRIPTION OF THE INVENTION

The present invention is a composition comprising by weight:
- 70 to 96% of at least one polyamide chosen from PA-11, PA-12, aliphatic polyamides resulting from the condensation of an aliphatic diamine having from 6 to 12 carbon atoms and an aliphatic diacid having from 9 to 12 carbon atoms, and 11/12 copolyamides having either more than 90% of nylon-11 units or more than 90% of nylon-12 units;
- 4 to 10% of a plasticizer;
- 0 to 25% of an NBR or H-NBR elastomer; and
- the sum of the amount of plasticizer and the amount of elastomer is between 4 and 30%.

These compositions can be manufactured by melt-blending the various constituents using standard techniques for thermoplastics. They are particularly useful for pipes used in the operation of offshore oil and gas fields. They exhibit very good ageing resistance. They are also useful for simpler pipes in motor vehicles, these compositions withstanding the ageing caused by the temperature under the bonnet of motor vehicles and the nature of the fluids transported.

The invention also relates to pipes comprising at least one layer of this composition. These are either pipes used offshore or simpler pipes for motor vehicles.

DETAILED DESCRIPTION OF THE INVENTION

As regards the polyamides, these have a number-average molecular mass $\overline{M}n$ generally greater than or equal to 25000 generally greater than or equal to 25000 and advantageously between 40000 and 100000. There weight-average molecular mass $\overline{M}w$ is in general greater than 40000 and advantageously between 50000 and 100000. Their inherent viscosity (measured at 20° C. for a $5 \times 10^{-3}$ g specimen per cm$^3$ of meta-cresol) is in general greater than 0.7.

As examples of aliphatic polyamides resulting from the condensation of an aliphatic diamine having from 6 to 12 carbon atoms and an aliphatic diacid having from 9 to 12 carbon atoms, mention may be made of:

PA-6, 12, resulting from the condensation of hexamethylenediamine and 1, 12-dodecanedioic acid;

PA-9, 12, resulting from the condensation of the $C_9$ diamine and 1, 12-dodecanedioic acid;

PA-10, 10, resulting from the condensation of the $C_{10}$ diamine and 1, 10-decanedioic acid; and PA-10, 12, resulting from the condensation of the $C_9$ diamine and 1, 12-dodecanedioic acid.

As regards the 11/12 copolyamides having either more than 90% of nylon-11 units or more than 90% of nylon-12 units, these result from the condensation of 1-aminoundecanoic acid with lauryllactam (or the $C_{12}$ α, Ω-amino acid).

Advantageously, the polyamide contains an organic or mineral catalyst which is added during the polycondensation. Preferably, this is phosphoric or hypophosphoric acid. The amount of catalyst may be up to 3000 ppm, and advantageously between 50 and 1000 ppm, relative to the amount of polyamide.

It would not be outside the scope of the invention to use a polyamide blend.

Advantageously, the polyamide is PA-11 or PA-12.

As regards the plasticizer, this is chosen from benzenesulphonamide derivatives, such as N-butylbenzenesulphonamide (BBSA), ethyetoluene-sulphonamide or N-cyclohexyltoluenesulphonamide; esters of hydroxybenzoic acids, such as 2-ethylhexyl-para-hydroxybenzoate and 2-decylhexyl-para-hydroxybenzoate; esters or ethers of tetrahydrofurfuryl alcohol, like oligoethyleneoxytetrahydrofurfuryl alcohol; and esters of citric acid or of hydroxymalonic acids, such as oligoethyleneoxy malonate. A particularly preferred plasticizer is N-butylbenzenesulphonamide (BBSA). It would not be outside the scope of the invention to use a mixture of plasticizers.

The plasticizer may be introduced into the polyamide during the polycondensation or later.

As regards the elastomer, these products are known per se and described, for example, in ULLMAN'S ENCYCLOPEDIA OF INDUSTRIAL CHEMISTRY, 5th edition, Vol. A 23, pages 255–261, the content being incorporated in the present application. NBR is preferred. The elastomer may also be crosslinked and all that is required is for the NBR to carry carboxylic or epoxy functional groups or for a crosslinking agent to be added, provided that this does not cause degradation of the polyamide.

With regard to the proportions, the proportion of plasticizer is advantageously between 5 and 9% and that of the elastomer is between 8 and 22%, the sum of the amount of plasticizer and the amount of elastomer being between 13 and 30%.

The amount of polyamide is advantageously between 72 and 92% for 28 to 8%, respectively, of the sum of the amount of plasticizer and the amount of elastomer.

The composition of the invention may also include additives such as antioxidants, UV stabilizers, pigments and other stabilizers. These products are known per se and are those normally used in polyamides. The amount of these additives may represent up to 5 parts and advantageously between 0.5 and 2 parts by weight per 100 parts of the combination of the polyamide, the plasticizer and the elastomer. This composition is prepared by melt-blending the various constituents in any mixing device and preferably an extruder. The composition is usually recovered in the form of granules. Advantageously, calcium stearate is added to these granules as anti-caking agent, this being done by simple dry blending. These granules are then remelted and extruded over the metal sheath which is to form the inner layer of the pipe. It is recommended to dry these granules really well before they are melted in order to process them. The moisture content is advantageously below 0.2% and preferably below 0.07%.

EXAMPLES

We used the following products:

NBR: acrylonitrile (19%)/butadiene random copolymer having a density of 0.98 g/cm$^3$ and a Mooney viscosity of 45±5, ML(1+4) at 100° C.;

PA-11: nylon-11 having a density of 1.030 g/cm$^3$ and an ISO inherent viscosity of 1.35 dl/g;

BBSA: N-butylbenzenesulphonamide (plasticizer);

Stab: system of "heat and light" stabilizing additives.

In all the examples, the inherent viscosity was measured at 20° C. in a solution consisting of 5×10$^{-3}$ g of polyamide per cm$^3$ of meta-cresol. The corrected ISO value of the inherent viscosity was obtained using the following formula:

$$\eta_{ISO\ corrected} = \eta_{measured} \times 100/[(100\% - x\%) \times 1.034]$$

where x%=content of extractables.

The NBR was ground beforehand after cooling with liquid nitrogen in a LANCELIN® crusher (pre-grinding on a 16 mm mesh and then reworking on a 6 mm mesh) in the presence of an anti-caking agent (calcium stearate).

The products were compounded in a WERNER® 40 (D/L=40)-type co-rotating twin-screw extruder. The latter comprised 10 zones numbered from F1 to F9 and the die.

The feed zone F1 was not heated and a 270° C. flat temperature profile was adopted for all the other zones.

The polyamide, the NBR and the Stab additive were introduced into zone F1 in the form of a dry blend by means of two separate weigh feeders.

The plasticizer (BBSA) was introduced in zone F6–7 by a metering pump. Vacuum degassing relative to 360 mm Hg was carried out in zone F4.

The die exit extrusion rate was 70 kg/h for a screw rotation speed of 300 rpm (revolutions per minute). The rod was granulated after cooling in a water tank. The granules from the various trials were then dried at 80° C. for 12 hours and packed in sealed bags after the moisture contents were checked (% water=0.08%).

Table 1 gives the compositions of the various compounds produced, together with some information obtained during the extrusion (head temperatures and pressures, torque). The % values indicated are wt % values. The vacuum was set so that the head pressure was constant from one trial to another at 17/18 bar.

TABLE 1

| | Trial | | | |
|---|---|---|---|---|
| | 1 | 2 (comparative) | 3 | 4 |
| PA-11 (%) | 91.8 | 86.8 | 80.1 | 73.3 |
| BBSA (%) | 7 | 12 | 8.7 | 5.5 |
| NBR | 0 | 0 | 10 | 20 |
| Stab (%) | 1.2 | 1.2 | 1.2 | 1.2 |
| Head mat. Temp. (° C.) | 279 | 277 | 279 | 285 |
| Head Press. (bar) | 18 | 17/18 | 9/10 | 9/10 |
| Torque (%) | 70 | 74 | 67 | 63 |

The morphology of the PA-11/NBR alloys was checked by scanning electron microscopy (SEM) of the cryogenic fracture surfaces after staining with $OsO_4$. In the case of two specimens (trials 3 and 4), a relatively homogeneous dispersion of the NBR nodules in the PA-11 matrix was observed. As regards trial 3 containing 10% NBR, the nodule sizes were generally between 0.1 μm and 1.5 μm. Apart from the coalesced nodules, the sizes in the case of trial 4 containing 20% NBR were generally between 0.1 μm and 2.7 μm.

A strip 2 mm in thickness (cut from plaques 200×200××2 $mm^3$ in size) was prepared by extrusion/calendering of the granules from the above trials. The extruder was of the AMUT® type (L/D=32; D=70 mm) and operated with a 220° C. flat temperature profile. The calender was of the AMUT® type, provided with 5 rolls, the respective temperatures (in ° C.) of which were: 45/45/60/20/20.

These plaques were cut using a blanking die so as to obtain the various bars and test pieces used subsequently for the characterization of the compositions and for the ageing studies.

Table 2 gives the information relating to the molecular masses of the compounds from the various trials after conversion (extrusion/calendering).

TABLE 2

| | Trial | | | |
|---|---|---|---|---|
| | 1 | 2 | 3 | 4 |
| ISO corrected inherent viscosity | 1.80 | 1.78 | — | — |
| $\overline{M}n$ | 37 800 | 40 700 | 28 650 | 23 950 |
| $\overline{M}w$ | 77 600 | 74 080 | 54 850 | 51 880 |

Ageing Tests

The ageing was carried out by keeping the test pieces (and/or bars) immersed in water at pH 7 (or in a 2D diesel/water mixture) at a suitable temperature (typically 110–140° C.).

The specimens were placed in autoclaves (H=32 cm, $D_{int}$=8 cm, $V_{int}$=1.5 l) with about twenty ISO ½ test pieces per autoclave. They were entirely immersed in one l of distilled water. Each autoclave was made inert by nitrogen being bubbled in for 3 hours at an $N_2$ flow rate of 50 l/h (deoxygenation). The inerting method was validated by direct measurement of the oxygen content at the outlet (%$O_2$<2 ppm). In the case of ageing carried out in a water/oil mixture, each of the fluids was inerted separately for 2 h (under the same conditions as those described above) and then brought together, (readjusting the volumes) and again inerted for 1 h.

These autoclaves thus inerted were placed in an oven set to the desired temperature (typically 100–140° C.) throughout the entire ageing. After each example was removed, the fluid was replaced and the autoclave inerted. The specimens were then dried on the surface and stored in inerted packaging before the various evaluation tests were carried out.

The tensile tests were carried out at 23° C. according to the ISO 527 1BA standard using an automated tensile testing machine fitted with an optical extensometer on ISO 1BA ½ test pieces cut from the extruded plaques with a die cutter (see above). The pull rate was 25 mm/min and the initial gauge length was 25 mm.

The flexural characteristics (apparent flexural modulus of elasticity) were determined according to the ISO 178:93 standard. The analysis was carried out at 23° C. on injection-moulded bars having dimensions of 80×10×4 $mm^3$ on an INSTRON® 1175-type tensile testing machine with a pull rate of 2 mm/min.

The impact strength at 23° C. was evaluated on notched injection-moulded bars having dimensions of 80×10×4 $mm^3$ according to the ISO 179-1/1eA standard. The pendulum impact tester used was of the ZWICK® 5102 type and the notch was made using a NOTCHVIS® automatic notcher (V notch of type A). The distance between supports was 62 mm.

The molecular masses were determined by stearic exclusion chromatography (SEC) on a WATERS® ALL/GPC 150-type apparatus fitted with a PLgel MIXED-B 10 μm column. The PA-based specimen (30 mg) was dissolved in benzyl alcohol at 130° C. for 3 h. The analysis was also carried out at 130° C.

Results

Table of results: mechanical properties, unaged

| | | Trial | | | |
|---|---|---|---|---|---|
| | Pure PA-11 | 1 | 2 | 3 | 4 |
| Flexural modulus (MPa) | 1030 | 420 | 310 | 300 | 350 |
| 23° C. notched Charpy impact strength (J/m) | + | + | + | ++ | +++ |
| Tensile test: stress at break (MPa) | 50 | 71.1 | 69.2 | 57.5 | 41 |
| Tensile test: elongation at break (%) | 310 | 372 | 398 | 387 | 302 |
| Δ weight in % at 125° C. (2D diesel) | 2.5 | −3.5 | −6.5 | 1.40%* | 1.46* |

*test carried out in ASTM No. 3 oil (oil similar to 2D diesel);
The more + symbols the better the result.

Table of ageing results

| | | | Trial | | | |
|---|---|---|---|---|---|---|
| | | Pure PA-11 | 1 | 2 | 3 | 4 |
| Water at 140° C. | Tensile ½ life | ++++ | +++ | + | ++ | ++ |
| | $\overline{M}w$ at ½ life | 31500 | 31000 | 31000 | 29000 | 29000 |
| Water at 120° C. | Tensile ½ life | ++++ | +++ | + | ++ | ++ |
| | $\overline{M}w$ at ½ life | 39000 | 39000 | 39500 | 35000 | 31000 |
| Oil/water at 120° C. | ½ life | +++++ | +++ | + | ++ | ++ |
| | $\overline{M}w$ at ½ life | id water 120° C. | id water 120° C. | id water 120° C. | id water 120° C. | id water 120° C. |

The tensile halflife is the time after which the elongation at break has fallen by a factor of 2.

Change in thermal behaviour (crystallinity) with extraction of BBSA. The plasticizer was extracted by placing a few granules of composition 1 (7% BBSA) and composition 2 (12% BBSA) in a glass tube, under vacuum, at 120° C. for 5 days. The amount of extractables from these specimens after these 5 days was then zero. The thermal properties of the specimens before and after extraction were determined by DSC analysis. This analysis was carried out in nitrogen according to the amended ISO 11357-1 standard on a PERKIN ELMER® DSC 7-type apparatus under the following conditions:
 span from 20° C. to 240° C.;
 1st heating/cooling/2nd heating:
 20/40/20° C.min$^{-1}$.

|  |  | Trial | |
|---|---|---|---|
|  |  | 1 | 2 |
| Before | $T_m$ (° C.) | 184.1 | 183.7 |
| extraction | ΔH of 1st heating (J/g) | 42.1 | 41.9 |
|  | Crystallinity $\chi_c$ (° C.) | 20.1 | 21.1 |
| After | $T_m$ (° C.) | 188.7 | 188.4 |
| extraction | ΔH of 1st heating (J/g) | 46.8 | 49.1 |
|  | Crystallinity $\chi_c$ (° C.) | 22 | 25.6 |

The preceding examples can be repeated with similar success by substituting the generically or specifically described reactants and/or operating conditions of this invention for those used in the preceding examples.

The entire disclosure of all applications, patents and publications, cited herein and of corresponding French application No. 02.02689, filed Mar. 4, 2002, is incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A composition comprising by weight:
 70 to 87% of at least one polyamide chosen from PA-11, PA-12, aliphatic polyamides resulting from the condensation of an aliphatic diamine having from 6 to 12 carbon atoms and an aliphatic diacid having from 9 to 12 carbon atoms, and 11/12 copolyamides having either more than 90% of nylon-11 units or more than 90% of nylon-12 units, wherein the polyamide does not contain a catalyst chosen from phosphoric acid and hypophosphoric acid;
 5 and 9% of a plasticizer;
 8 and 22% of a nitrile butadiene rubber elastomer or a hydrogenated nitrile butadiene rubber elastomer; and
 the sum of the amount of plasticizer and the amount of elastomer is between 13 and 30%.

2. A composition according to claim 1, wherein the polyamide is PA-11 or PA-12.

3. A composition according to claim 2, wherein the plasticizer is N-butylbenzenesulphonamide.

4. A composition according to claim 2, wherein the amount of polyamide is between 72 and 87%, and the sum of the amount of plasticizer and the amount of elastomer is 13% to 28%.

5. A composition according to claim 1, wherein the plasticizer is N-butylbenzenesulphonamide.

6. A composition according to claim 5, wherein the amount of polyamide is between 72 and 87%, and the sum of the amount of plasticizer and the amount of elastomer is 13% to 28%.

7. A composition according to claim 1, wherein the amount of polyamide is between 72 and 87%, and the sum of the amount of plasticizer and the amount of elastomer is 13% to 28%.

8. In a pipe comprising one or more layers, the improvement wherein at least one layer is made of a composition according to claim 1.

9. A composition according to claim 1, wherein said at least one polyamide has a number-average molecular mass $\overline{M}n$ which is greater than or equal to 25000.

10. A composition according to claim 1, wherein said at least one polyamide has a number-average molecular mass $\overline{M}n$ which is between 40000 and 100000.

11. A composition according to claim 10, wherein said at least one polyamide has a weight-average molecular mass $\overline{M}w$ between 50000 and 100000.

12. A composition according to claim 1, wherein said at least one polyamide has a weight-average molecular mass $\overline{M}w$ greater than 40000.

13. A composition according to claim 1, wherein said at least one polyamide has a weight-average molecular mass $\overline{M}w$ between 50000 and 100000.

14. A composition according to claim 1, wherein said at least one polyamide has an inherent viscosity greater than 0.7, measured at 20° C. for a $5 \times 10^{-3}$ g specimen per cm$^3$ of meta-cresol.

15. A composition according to claim 1, wherein said at least one polyamide is:
 PA-6, 12, resulting from condensation of hexamethylenediamine and 1, 12-dodecanedioic acid;
 PA-9, 12, resulting from condensation of C$_9$ diamine and 1, 12-dodecanedioic acid;
 PA-10, 10, resulting from condensation of C$_{10}$ diamine and 1, 10-decanedioic acid; or
 PA-10, 12, resulting from condensation of C$_9$ diamine and 1, 12-dodecanedioic acid.

16. A composition according to claim 1, wherein the plasticizer is N-butylbenzenesulphonamide, ethyltoluenesulphonamide, N-cyclohexyltoluenesulphonamide, 2-ethylhexyl-para-hydroxybenzoate, 2-decylhexyl-para-hydroxybenzoate, oligoethyleneoxytetrahydrofurfuryl alcohol, or oligoethyleneoxy malonate.

17. A composition according to claim 1, wherein the plasticizer is an ester of hydroxybenzoic acid, an ester or ether of tetrahydrofurfuryl alcohol, an ester of citric acid or an ester of hydroxymalonic acid.

18. A composition according to claim 1, wherein said elastomer is crosslinked.

19. A composition according to claim 1, wherein said composition further contains one or more additives in an amount of between 0.5 and 2 parts by weight per 100 parts of the combination of the polyamide, the plasticizer and the elastomer.

20. A composition according to claim 19, wherein said one or more additives are selected from antioxidants, UV stabilizers, pigments and other stabilizers.

21. A composition according to claim 1, wherein said composition contains 73.3–80.1% of said at least one polyamide; 5.5–8.7% of said plasticizer; and 10 to 20% of said nitrile butadiene rubber elastomer or said hydrogenated nitrile butadiene rubber elastomer.

22. A composition according to claim 1, wherein said elastomer is a nitrile butadiene rubber elastomer that does not contain epoxy groups.

23. A composition comprising by weight:
 70 to 87% of at least one polyamide chosen from PA-11, PA-12, aliphatic polyamides resulting from the condensation of an aliphatic diamine having from 6 to 12 carbon atoms and an aliphatic diacid having from 9 to 12 carbon atoms, and 11/12 copolyamides having either more than 90% of nylon-11 units or more than 90% of nylon-12 units, wherein the polyamide does not contain a catalyst chosen from phosphoric acid and hypophosphoric acid;

5 and 9% of a plasticizer;

8 and 22% of a nitrile butadiene rubber elastomer or a hydrogenated nitrile butadiene rubber elastomer; and the sum of the amount of plasticizer and the amount of elastomer is between 13 and 30%, and said elastomer is a nitrile butadiene rubber elastomer that does not contain epoxy groups.

24. A composition according to claim 23, wherein the polyamide is PA-11 or PA-12.

25. A composition according to claim 23, wherein the plasticizer is N-butylbenzenesulphonamide.

26. A composition according to claim 23, wherein the amount of polyamide is between 72 and 87%, and the sum of the amount of plasticizer and the amount of elastomer is 13% to 28%.

27. A composition according to claim 23, wherein said at least one polyamide is:

PA-6, 12, resulting from condensation of hexamethylenediamine and 1, 12-dodecanedioic acid;

PA-9, 12, resulting from condensation of $C_9$ diamine and 1, 12-dodecanedioic acid;

PA-10, 10, resulting from condensation of $C_{10}$ diamine and 1, 10-decanedioic acid; or PA-10, 12, resulting from condensation of $C_9$ diamine and 1, 12-dodecanedioic acid.

28. A composition according to claim 23, wherein the plasticizer is N-butylbenzenesulphonamide, ethyltoluenesulphonamide, N-cyclohexyltoluenesulphonamide, 2-ethylhexyl-para-hydroxybenzoate, 2-decylhexyl-para-hydroxybenzoate, oligoethyleneoxytetrahydrofurfuryl alcohol, or oligoethyleneoxy malonate.

29. A composition according to claim 23, wherein the plasticizer is an ester of hydroxybenzoic acid, an ester or ether of tetrahydrofurfuryl alcohol, an ester of citric acid or an ester of hydroxymalonic acid.

* * * * *

UNITED STATES PATENT AND TRADEMARK OFFICE
CERTIFICATE OF CORRECTION

PATENT NO.        : 7,045,185 B2
APPLICATION NO. : 11/012620
DATED             : May 16, 2006
INVENTOR(S)       : Bernard Jacques et al.

It is certified that error appears in the above-identified patent and that said Letters Patent is hereby corrected as shown below:

Column 8, line 8, reads "polyaniide" should read -- polyamide --
Column 8, line 35, reads "suiphonamide" should read -- sulphonamide --
Column 9, line 4, reads "5 and 9%" should read -- 5 to 9% --
Column 9, line 5, reads "8 and 22%" should read -- 8 to 22% --

Signed and Sealed this

Thirtieth Day of January, 2007

JON W. DUDAS
*Director of the United States Patent and Trademark Office*